Figure 4:
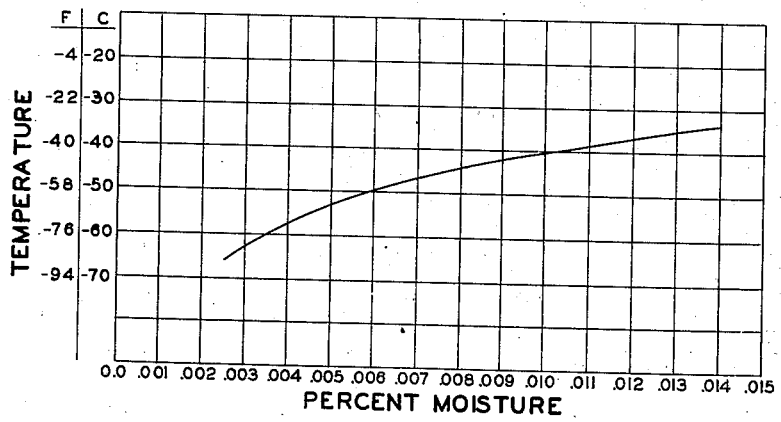

Jan. 24, 1939. W. O. WALKER ET AL 2,145,203
METHOD OF ANALYSIS
Filed Aug. 18, 1938  2 Sheets-Sheet 1
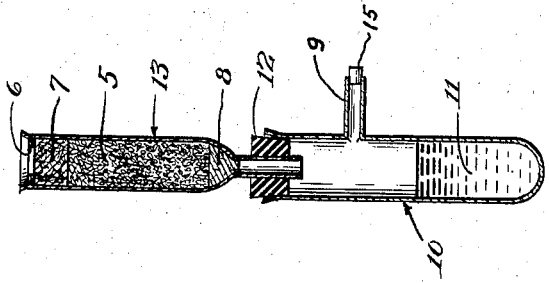
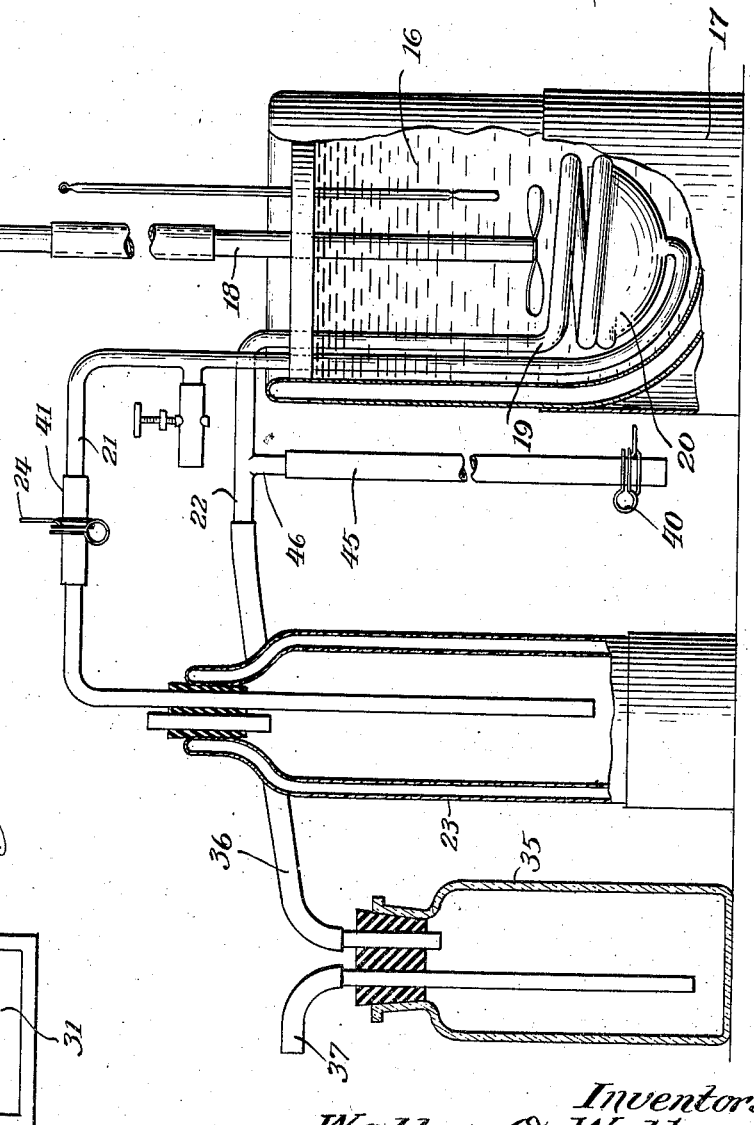
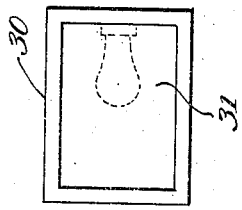
Inventors:
Walter O. Walker
and William R. Rinelli
By Joseph Rossman
Attorney Jan. 24, 1939.   W. O. WALKER ET AL   2,145,203
METHOD OF ANALYSIS
Filed Aug. 18, 1938   2 Sheets-Sheet 2

Inventors:
Walter O. Walker
and William R. Rinelli
By Joseph Rossman
Attorney

Patented Jan. 24, 1939

2,145,203

UNITED STATES PATENT OFFICE 2,145,203

METHOD OF ANALYSIS

Walter O. Walker and William R. Rinelli, Marinette, Wis., assignors to Ansul Chemical Company, Marinette, Wis., a corporation of Wisconsin Application August 18, 1938, Serial No. 225,646

14 Claims. (Cl. 23—230)

This invention relates to methods of analysis. More particularly the invention relates to an improved rapid and accurate method for determining the percentage of moisture in organic liquids such as hydrocarbon halide refrigerants and mixtures thereof, or in oil-refrigerant mixtures used in refrigerating machines.

In order to operate refrigerating machines satisfactorily it is essential that the moisture content of the refrigerant working fluid should not become excessive as otherwise the moisture will crystallize out, thereby clogging the valves and other operating parts of the refrigerating machine and/or cause corrosion. It is therefore important to be able to determine quickly and accurately the moisture content of a refrigerant or oil-refrigerant mixture to be used or in actual use in an operating refrigerating machine so as to determine whether the moisture content is excessive.

The conventional methods for determining the moisture content of refrigerants are very laborious, time consuming, and at best not altogether accurate. Such methods usually require the use of large quantities of the refrigerant in question which are evaporated or volatilized in order to determine the moisture content therein. Furthermore, considerable apparatus is required which cannot be conveniently used in the field.

The present method of analysis obviates these disadvantages and difficulties. A very simple and portable apparatus is required which can be readily taken in the field for test purposes. Our method requires only a small amount of the refrigerant to be tested and offers a very rapid and accurate analysis of the moisture content without requiring any special manipulative skill or training.

Briefly, our method is carried out as follows: A sample of the refrigerant, mixed refrigerant, refrigerant working fluid, or oil-refrigerant mixture is collected in a dry test tube protected by a suitable device for the prevention of entrance of moisture. The tube and its contents are immersed in a cold bath, the temperature of which may be reduced a few degrees at a time. We have discovered that there is a definite relationship between the percentage of moisture in a refrigerant, mixtures thereof, refrigerant working fluid, or in an oil-refrigerant mixture and the temperature at which this moisture freezes out as ice crystals. By means of this relationship we are enabled to determine accurately and quickly the moisture content of a mixture or of the pure refrigerant.

Figure 5:
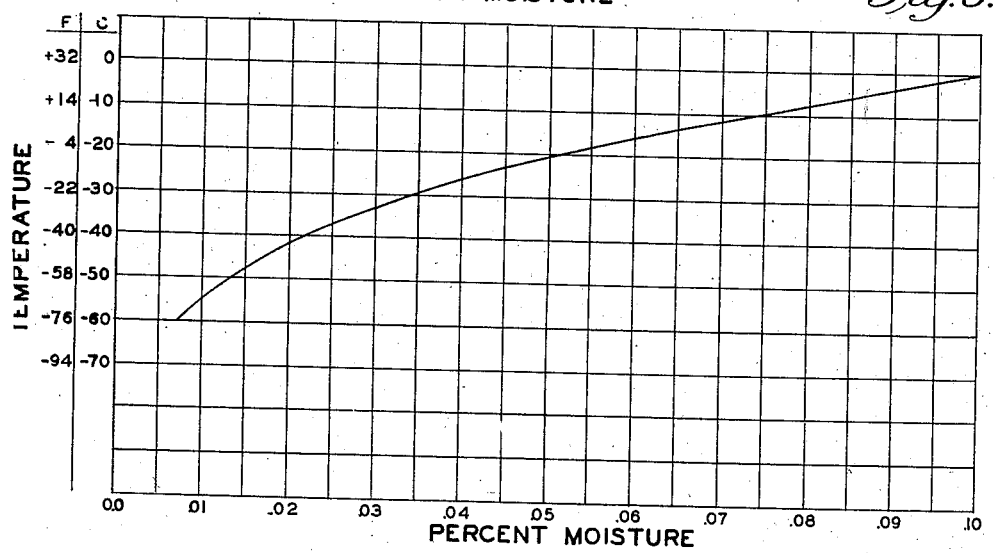
Figure 6:
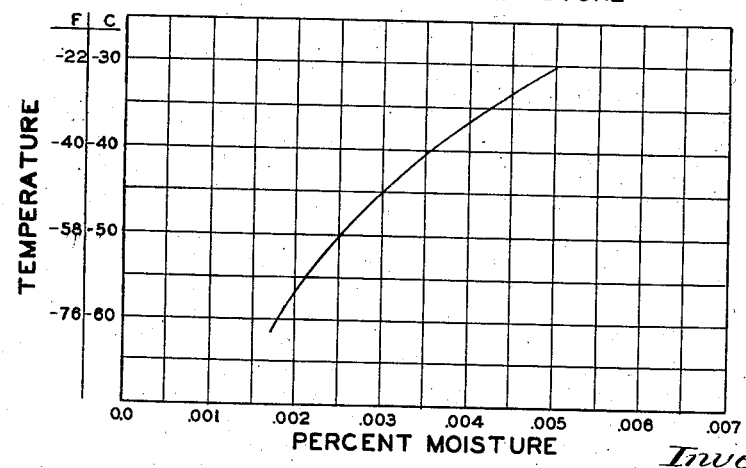

Further details of the invention may be had by reference to the appended drawings wherein:

Figure 1 represents a test tube with side arm containing the refrigerant or refrigerant working fluid to be tested, Figure 2 is a diagrammatic view of the apparatus used for cooling the refrigerant contained in the receptacle shown in Figure 1, Figure 3 is a light box with a frosted glass front for the examination of the test tube, Figure 4 is a graph for methyl chloride and methyl chloride containing acrolein showing ice formation temperatures plotted against percent by weight of moisture, Figure 5 is a graph for methylene chloride (Carrene) showing ice formation temperatures plotted against percent by weight of moisture, and Figure 6 is a graph for 40% by weight methyl chloride and 60% "Freon 12" showing ice formation temperatures plotted against percent by weight of moisture.

Referring to the drawings, a clean, transparent-walled receptacle, such as a glass test tube 10 with side arm 9, free from foreign matter, is provided in which the refrigerant or refrigerant working fluid 11 to be tested is placed. A drying tube 13 is also provided which is adapted to be fitted to the test tube by stopper 12. Drying tube 13 is provided at its lower end with felt 8, a layer of activated alumina, or other suitable desiccant 5, a cotton plug 7, and a cork ring 6. The test tube with side arm and drying tube 13 are thoroughly dried at a temperature of 100° to 110° C. prior to placing therein the refrigerant or refrigerant working fluid to be tested. The test tube with side arm and drying tube (closed with stopper 15) are assembled while hot and permitted to cool. Stopper 15 is removed and the test tube is filled about ⅓ full through the side arm 9 with the liquid 11 to be tested, care being taken that no extraneous moisture is included in the tube by closing the side arm of the test tube with a stopper 15 immediately after sampling. When the samples to be tested are secured, care should be taken to use dried valve fittings or connections, by suitably heating and drying the parts used. It is also desirable to flush out the fittings prior to taking the sample to be tested so as to remove any moisture in these parts.

After the sample to be tested is poured in the test tube it is immediately immersed in a bath 16 contained preferably in a thermos jar 17 shown in Figure 2. Anhydrous methyl alcohol is suitable as a bath liquid. The temperature of the bath should be kept a few degrees below the boiling point of the liquid in the sample tube, otherwise the tubes must be sealed. In order to insure a uniform temperature in all parts of the bath, a stirrer 18 is placed therein operating at a suitable speed. A cooling coil 19 provided with an expansion chamber 20 is immersed in the bath. The coil is provided with an inlet tube 21 and an outlet tube 22. The inlet tube is connected by rubber tubing 41 to a source of liquid ammonia or other suitable refrigerating liquid contained in a vessel 23. A clamp 24 is provided in the tubing to control the rate of ammonia or other suitable refrigerant supplied to the cooling coil. Outlet 22 is connected to a water trap 35 by means of tubing 36. Tube 37 is connected to a suitable vacuum or filter pump. When the vacuum pump is operated suction is applied to the outlet tube 22 to remove the ammonia or other suitable refrigerant vapors and to draw in the liquid refrigerant from vessel 23 into the cooling coil. In order to stop the cooling action the vacuum is broken by opening pinch clamp 40 provided on rubber tubing 45 which is connected to outlet tube 22 by a side tube 46.

Small volumes of liquid ammonia (5–10 cc.) are introduced into the cooling coil by opening clamp 24 slightly. Care must be taken not to admit larger volumes of ammonia or other suitable refrigerant, since to do so may result in violent boiling and unnecessary waste. Repetition of this operation will result in cooling the bath to the desired temperature. By observing these precautions the temperature of the bath can be kept constant within about 1° C. at any temperature between +15° and —65° C.

At the beginning of the cooling process the temperature of the bath should be kept at the chosen temperature for the particular liquid in the sample tube for at least eight minutes. The temperature of the bath is then decreased by about 1° intervals, more or less, depending on the accuracy required. In order to detect ice crystals when, and if they are formed, the sample tube is taken out of the bath and examined in front of a suitable light source such as a light box 30 provided with a frosted glass front 31 shown in Figure 3. The test tube is held at an angle of about 45° before the frosted glass and rotated slowly.

Ice crystals usually separate in the form of a ring at the liquid level of the upright tube. They also separate below the liquid level, sometimes only in patches and give an appearance of an etched surface when they first come out.

The temperature of crystallization is taken at the point at which ice crystals first appear. In order to avoid error due to traces of foreign matter which occasionally are found in the tube and which may be mistaken for ice crystals, the temperature is lowered about 2°. If after eight minutes the crystals increase in amount, the temperature at which they started to form is taken as the temperature of crystallization.

After the first examination, the temperature is decreased through the next interval, kept there for at least eight minutes and the tube examined in the manner previously explained. These steps are repeated until ice crystals appear.

The temperature at which the ice crystals first appear is noted and the percent by weight of moisture read directly from a graph. For example, an ice crystal formation temperature for a sample of acrolein methyl chloride or methyl chloride is —45° C. This corresponds to a moisture content of 0.0078% by reference to a graph shown in Figure 4 for methyl chloride.

The same procedure is followed in ascertaining the moisture content of other refrigerants or mixtures thereof and by reference to graphs prepared for each refrigerant tested. Figure 5, for example, is a graph for methylene chloride showing the percent by weight of moisture at the corresponding temperatures indicated.

Figure 6 is a graph for a mixture of "Freon 12" (dichlorodifluoromethane) 60% by weight and methyl chloride showing the percent by weight of moisture at the corresponding temperatures indicated. In the case of refrigerants such as "Freon 12" which at low temperatures forms crystals which may be confused with ice crystals, it is preferred for the sake of accuracy of moisture determination to mix such refrigerant with a definite amount of another refrigerant such as methyl chloride having a known moisture content. The ice crystal temperature is determined for this mixture in accordance with the procedure previously outlined. The percentage of moisture in the mixed refrigerant is then determined by reference to the graph shown in Figure 6. The percentage of moisture in the "Freon 12" can be calculated using the formula:

$$\frac{A-(.4\times B)}{.6} = \% \text{ H}_2\text{O in "Freon 12"}$$

where:
A = % moisture in mixture.
B = % moisture in methyl chloride.

This procedure may be obviously modified for other mixtures of refrigerants for determination of the moisture content of the original components in the mixture.

In the event sampling of the refrigerant, mixed refrigerants, or oil-refrigerant mixtures must be carried out at some distance from the testing apparatus, the tubes containing the samples of liquid may be placed in metal screen receptacles immersed in liquid methyl chloride, or any suitable bath liquid which has a temperature equal to or just below the boiling point of the refrigerant being tested. These tubes should be transferred to the testing apparatus as soon as possible.

It is to be understood that the invention is not restricted to the specific apparatus disclosed, as any suitable means may be used for the controlled cooling of the sample to be tested. Our invention is also not restricted to testing the specific substances herein referred to as they are merely given as exemplifications of the invention. Our method of analysis is applicable generally to organic liquids containing small amounts of moisture. The method is particularly adapted for the determination of the moisture in hydrocarbon halide refrigerants such as methyl chloride, methylene chloride, dichlorodifluoromethane, trichloromonofluoromethane and dichlorotetrafluoroethane and mixtures thereof.

We claim:
1. The method of determining the moisture content of a liquid containing small amounts of moisture which comprises cooling the liquid by small decrements of temperature changes until the moisture in said liquid crystallizes in visible form and noting the temperature at which said moisture crystallizes.

2. The method of determining the moisture content of a hydrocarbon halide refrigerant or mixtures thereof containing small amounts of moisture which comprises cooling the liquid by small decrements of temperature changes until the moisture in said liquid crystallizes in visible form and noting the temperature at which said moisture crystallizes.

3. The method of determining the moisture content of a hydrocarbon halide refrigerant or mixtures thereof containing small amounts of moisture which comprises cooling the liquid in decrements of about one degree centigrade, until the moisture in said liquid crystallizes in visible form and noting the temperature at which said moisture crystallizes.

4. The method of determining the moisture content of a refrigerant working fluid containing methyl chloride which comprises cooling the liquid by small decrements of temperature changes until the moisture in said liquid crystallizes in visible form and noting the temperature at which said moisture crystallizes.

5. The method of determining the moisture content of a refrigerant working fluid containing methyl chloride which comprises cooling the liquid in decrements of about one degree centigrade, until the moisture in said liquid crystallizes in visible form and noting the temperature at which said moisture crystallizes.

6. The method of determining the moisture content of a refrigerant by reference to a moisture crystal formation graph having as its ordinate the temperatures of visible moisture crystal formation and as abscissa the corresponding percentage moisture content which comprises cooling a refrigerant by small decrements of temperature changes until visible ice crystals begin to form and noting the temperature at which the ice crystals form whereby the corresponding moisture content in said refrigerant can be ascertained from said curve.

7. The method of determining the moisture content of a refrigerant which comprises placing a small amount of a refrigerant to be tested in a dry test tube, excluding the entrance of extraneous moisture, immersing the test tube in a refrigerated bath, reducing the temperature of said bath a few degrees at short intervals of time and noting the temperature at which visible ice crystals form whereby a critical factor is secured for determining the corresponding moisture content of said refrigerant.

8. The method of determining the moisture content of a liquid containing small amounts of moisture which comprises placing a small amount of refrigerant to be tested in a dry test tube, excluding the entrance of extraneous moisture, immersing the test tube in a refrigerated bath, reducing the temperature of said bath a few degrees at short intervals of time and noting the temperature at which visible ice crystals form whereby a critical factor is secured for determining the corresponding moisture content of said refrigerant.

9. The method of determining the moisture content of a hydrocarbon halide refrigerant or mixtures thereof which comprises placing a small amount of a refrigerant to be tested in a dry test tube, excluding the entrance of extraneous moisture, immersing the test tube in a refrigerated bath, reducing the temperature of said bath a few degrees at short intervals of time and noting the temparture at which visible ice crystals form whereby a critical factor is secured for determining the corresponding moisture content of said refrigerant.

10. The method of determining the moisture content of a refrigerant working fluid containing methyl chloride which comprises placing a small amount of a refrigerant to be tested in a dry test tube, excluding the entrance of extraneous moisture, immersing the test tube in a refrigerated bath, reducing the temperature of said bath a few degrees at short intervals of time and noting the temperature at which visible ice crystals form whereby a critical factor is secured for determining the corresponding moisture content of said refrigerant.

11. The method of determining the moisture content of a refrigerant working fluid containing methyl chloride which comprises placing a small quantity of said refrigerant in a transparent container, immersing said container in a refrigerated bath cooled to a temperature of about −30° C., maintaining said temperature for about eight minutes, lowering the temperature of said bath by decrements of about 1° C., maintaining the refrigerant at each temperature for about eight minutes and noting the temperature at which visible ice crystals form in said refrigerant whereby a critical factor is secured for determining the corresponding moisture content of said refrigerant.

12. The method of determining the moisture content of a refrigerant which comprises placing a small quantity of said refrigerant in a transparent container, immersing said container in a refrigerated bath, cooled to a temperature below the boiling point of said refrigerant, maintaining said temperature for about eight minutes, lowering the temperature of said bath by decrements of about 1° C., maintaining the refrigerant at each temperature for about eight minutes and noting the temperature at which visible ice crystals form in said refrigerant whereby a critical factor is secured for determining the corresponding moisture content of said refrigerant.

13. The method of determining the moisture content of a refrigerant working fluid containing methylene chloride which comprises placing a small quantity of said refrigerant in a transparent container, immersing said container in a refrigerated bath cooled to a temperature of about 0° C., maintaining said temperature for about eight minutes, lowering the temperature of said bath by decrements of about 1° C., maintaining the refrigerant at each temperature for about eight minutes and noting the temperature at which visible ice crystals form in said refrigerant whereby a critical factor is secured for determining the corresponding moisture content of said refrigerant.

14. The method of determining the moisture content of a refrigerant working fluid containing dichlorodifluoromethane and methyl chloride which comprises placing a small quantity of said refrigerant in a transparent container, immersing said container in a refrigerated bath cooled to a temperature of about −30° C., maintaining said temperature for about eight minutes, lowering the temperature of said bath by decrements of about 1° C., maintaining the refrigerant at each temperature for about eight minutes and noting the temperature at which visible ice crystals form in said refrigerant whereby a critical factor is secured for determining the corresponding moisture content of said refrigerant.

WALTER O. WALKER.
WILLIAM R. RINELLI.